(12) United States Patent
Martin et al.

(10) Patent No.: US 10,457,147 B2
(45) Date of Patent: Oct. 29, 2019

(54) CONTROLLING OPERATION OF ELECTRIFIED VEHICLES TRAVELING ON INDUCTIVE ROADWAY TO INFLUENCE ELECTRICAL GRID

(71) Applicant: FORD GLOBAL TECHNOLOGIES, LLC, Dearborn, MI (US)

(72) Inventors: Douglas Raymond Martin, Canton, MI (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 517 days.

(21) Appl. No.: 15/160,149

(22) Filed: May 20, 2016

(65) Prior Publication Data

US 2017/0334296 A1    Nov. 23, 2017

(51) Int. Cl.

| | |
|---|---|
| *B60L 5/00* | (2006.01) |
| *B60K 6/365* | (2007.10) |
| *B60K 6/40* | (2007.10) |
| *B60K 6/445* | (2007.10) |
| *H02J 5/00* | (2016.01) |
| *B60M 3/06* | (2006.01) |
| *H02J 7/02* | (2016.01) |
| *H02J 7/04* | (2006.01) |
| *H02J 50/10* | (2016.01) |
| *H02J 50/80* | (2016.01) |
| *B60L 53/12* | (2019.01) |

(Continued)

(52) U.S. Cl.
CPC .............. *B60L 5/005* (2013.01); *B60K 6/365* (2013.01); *B60K 6/40* (2013.01); *B60K 6/445* (2013.01); *B60L 53/12* (2019.02); *B60L 55/00* (2019.02); *B60L 58/30* (2019.02); *B60M 3/06* (2013.01); *H02J 5/005* (2013.01); *H02J 7/025* (2013.01); *H02J 7/04* (2013.01); *H02J 50/10* (2016.02); *H02J 50/80* (2016.02); *B60Y 2200/92* (2013.01); *B60Y 2400/21* (2013.01); *H02J 2007/0096* (2013.01); *Y02E 60/721* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y02T 90/34* (2013.01); *Y04S 10/126* (2013.01); *Y10S 903/91* (2013.01); *Y10S 903/951* (2013.01)

(58) Field of Classification Search
CPC .................................. B60L 5/005; B60K 6/40
See application file for complete search history.

(56) References Cited

U.S. PATENT DOCUMENTS

| | | | |
|---|---|---|---|
| 7,849,944 B2 | 12/2010 | DeVault | |
| 2005/0178632 A1 | 8/2005 | Ross | |

(Continued)

FOREIGN PATENT DOCUMENTS

| | | |
|---|---|---|
| CN | 102480158 A | 5/2012 |
| GB | 2497828 B | 12/2013 |
| JP | 2015508989 A | 3/2015 |

*Primary Examiner* — Jason C Smith
(74) *Attorney, Agent, or Firm* — Carlson, Gaskey & Olds (57) ABSTRACT

A method for influencing the efficiency of an electrical grid includes coordinating operation of a first electrified vehicle and a second electrified vehicle traveling along an inductive roadway and having opposite power needs in a manner that influences an amount of energy supplied by the electrical grid during an inductive roadway event.

6 Claims, 6 Drawing Sheets

(51) Int. Cl.
*B60L 55/00* (2019.01)
*B60L 58/30* (2019.01)
*H02J 7/00* (2006.01)

(56) References Cited

U.S. PATENT DOCUMENTS

| | | |
|---|---|---|
| 2007/0282495 A1 | 12/2007 | Kempton et al. |
| 2008/0308328 A1 | 12/2008 | Kejha |
| 2011/0047052 A1 | 2/2011 | Cornish |
| 2011/0166731 A1 | 7/2011 | Kristinsson et al. |
| 2011/0302078 A1* | 12/2011 | Failing ............... B60L 3/00 705/39 |
| 2012/0123709 A1 | 5/2012 | Chen et al. |
| 2013/0025992 A1* | 1/2013 | Asplund ............... B60L 5/42 191/22 C |
| 2013/0035814 A1* | 2/2013 | Boyer ............... B60L 11/1816 701/22 |
| 2013/0241485 A1 | 9/2013 | Snyder |
| 2014/0012446 A1* | 1/2014 | Kumar ............... B60L 11/1801 701/22 |
| 2014/0081563 A1 | 3/2014 | Wang et al. |
| 2015/0097512 A1 | 4/2015 | Li et al. |
| 2015/0246614 A1 | 9/2015 | Dames et al. |
| 2016/0129793 A1* | 5/2016 | Cronie ............... B60L 11/182 320/109 |
| 2016/0141919 A1* | 5/2016 | Ohashi ............... H02J 7/00 320/108 |
| 2016/0355094 A1* | 12/2016 | Yamakawa ............... B60L 1/06 |
| 2017/0334296 A1* | 11/2017 | Martin ............... B60K 6/365 |
| 2018/0105054 A1* | 4/2018 | Fan ............... H02J 7/025 |

* cited by examiner

CONTROLLING OPERATION OF ELECTRIFIED VEHICLES TRAVELING ON INDUCTIVE ROADWAY TO INFLUENCE ELECTRICAL GRID

TECHNICAL FIELD

This disclosure relates to vehicle systems and methods for controlling electrified vehicles. Operation of two or more electrified vehicles traveling along an inductive roadway and having opposite power needs may be coordinated in a manner that influences the efficiency of both the electrical grid and the electrified vehicles.

BACKGROUND

The need to reduce automotive fuel consumption and emissions is well known. Therefore, vehicles are being developed that reduce reliance on internal combustion engines. Electrified vehicles are one type of vehicle currently being developed for this purpose. In general, electrified vehicles differ from conventional motor vehicles because they are selectively driven by one or more battery powered electric machines and may have additional power sources such as an internal combustion engine. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged. The energy necessary for recharging the battery cells is commonly sourced from an electrical grid. The electrical grid includes an interconnected network of generating stations (coal, gas, nuclear, chemical, hydro, solar, wind, etc.), demand centers, and transmission lines that produce and deliver electrical power to consumers. Energy production of the electrical grid must be constantly balanced against the energy demand from the consumers.

SUMMARY

A method for influencing the efficiency of an electrical grid according to an exemplary aspect of the present disclosure includes, among other things, coordinating operation of a first electrified vehicle and a second electrified vehicle traveling along an inductive roadway and having opposite power needs in a manner that influences an amount of energy supplied by the electrical grid during an inductive roadway event.

In a further non-limiting embodiment of the foregoing method, the opposite power needs indicate that one of the first electrified vehicle and the second electrified vehicle needs to discharge excess regenerative energy to the inductive roadway and the other of the first electrified vehicle and the second electrified vehicle needs to receive power from the inductive roadway.

In a further non-limiting embodiment of either of the foregoing methods, the method includes communicating vehicle data from both the first electrified vehicle and the second electrified vehicle to an inductive roadway interface and the electrical grid.

In a further non-limiting embodiment of any of the foregoing methods, coordinating the operation of the first electrified vehicle and the second electrified vehicle includes at least one of providing more or less battery power, engine power or wheel torque.

In a further non-limiting embodiment of any of the foregoing methods, the method includes adding energy from the first electrified vehicle to the inductive roadway and then from the inductive roadway to the second electrified vehicle if the first electrified vehicle is traveling along an area of expected power absorption of the inductive roadway and the second electrified vehicle is traveling along an area of expected power usage of the inductive roadway.

In a further non-limiting embodiment of any of the foregoing methods, the method includes, prior to coordinating operation, determining whether the first electrified vehicle and the second electrified vehicle are traveling along the inductive roadway and are exhibiting the opposite power needs.

In a further non-limiting embodiment of any of the foregoing methods, the method includes determining a common power necessary to meet a power demand of both the first electrified vehicle and the second electrified vehicle.

In a further non-limiting embodiment of any of the foregoing methods, coordinating operation of the first electrified vehicle and the second electrified vehicle includes controlling an inductive charging system of the first electrified vehicle and the second electrified vehicle to either send electrical energy to the inductive roadway or accept electrical energy from the inductive roadway.

In a further non-limiting embodiment of any of the foregoing methods, coordinating operation of the first electrified vehicle and the second electrified vehicle includes discharging energy from the first electrified vehicle traveling on a first section of the inductive roadway to an inductive roadway interface and powering a second electrified vehicle traveling on a second section of the inductive roadway using the energy discharged from the first electrified vehicle.

In a further non-limiting embodiment of any of the foregoing methods, the method includes adding additional energy to the second electrified vehicle from the electrical grid if an electrical shortage is still occurring on the second electrified vehicle after powering the second electrified vehicle using the energy discharged from the first electrified vehicle.

In a further non-limiting embodiment of any of the foregoing methods, the method includes discharging additional energy from the first electrified vehicle to the inductive roadway if an electrical surplus is still occurring on the first electrified vehicle after powering the second electrified vehicle using the energy discharged from the first electrified vehicle.

An electrified vehicle according to another exemplary aspect of the present disclosure includes, among other things, a set of drive wheels, an energy storage device configured to selectively power the drive wheels, and a control system configured with instructions for coordinating a transfer of energy between the electrified vehicle and other electrified vehicles traveling along an inductive roadway and which have opposite power needs from the electrified vehicle.

In a further non-limiting embodiment of the foregoing electrified vehicle, the energy storage device is a battery pack.

In a further non-limiting embodiment of either of the foregoing electrified vehicles, the control system is configured to adjust operation of the electrified vehicle to either accept energy from or discharge energy to an inductive roadway interface.

In a further non-limiting embodiment of any of the foregoing electrified vehicles, the control system is configured to detect the other electrified vehicles traveling on the inductive roadway prior to coordinating the transfer of energy.

In a further non-limiting embodiment of any of the foregoing electrified vehicles, the electrified vehicle includes an inductive charging system in communication with an inductive roadway interface to transfer the energy.

In a further non-limiting embodiment of any of the foregoing electrified vehicles, the opposite power needs indicate that the electrified vehicle or one of the other electrified vehicles needs to discharge excess regenerative energy to the inductive roadway and the other of the electrified vehicle and the one of the other electrified vehicles needs to receive power from the inductive roadway.

In a further non-limiting embodiment of any of the foregoing electrified vehicles, the control system is configured to receive a wireless grid signal from an electrical grid.

In a further non-limiting embodiment of any of the foregoing electrified vehicles, a power source is configured to selectively power the drive wheels.

In a further non-limiting embodiment of any of the foregoing electrified vehicles, the power source is an engine or a fuel cell.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle system for communicating with other electrified vehicles traveling along an inductive roadway. An exemplary vehicle control strategy includes controlling operation of electrified vehicles traveling along the inductive roadway and having opposite power needs in a manner that influences the efficiency of an electrical grid. In some embodiments, energy is discharged from a first electrified vehicle traveling on a first section of the inductive roadway (e.g., an area of expected power absorption such as downhill sections or exit ramps) to an inductive roadway interface, and this energy is then used to power a second electrified vehicle traveling on a second section of the inductive roadway (e.g., an area of expected power usage such as uphill sections or on-ramps). This strategy improves the efficiencies of the inductive roadway and the electrified vehicles traveling thereon by minimizing the amount of power supplied by the electrical grid. These and other features are discussed in greater detail in the following paragraphs of this detailed description.

Figure 1:
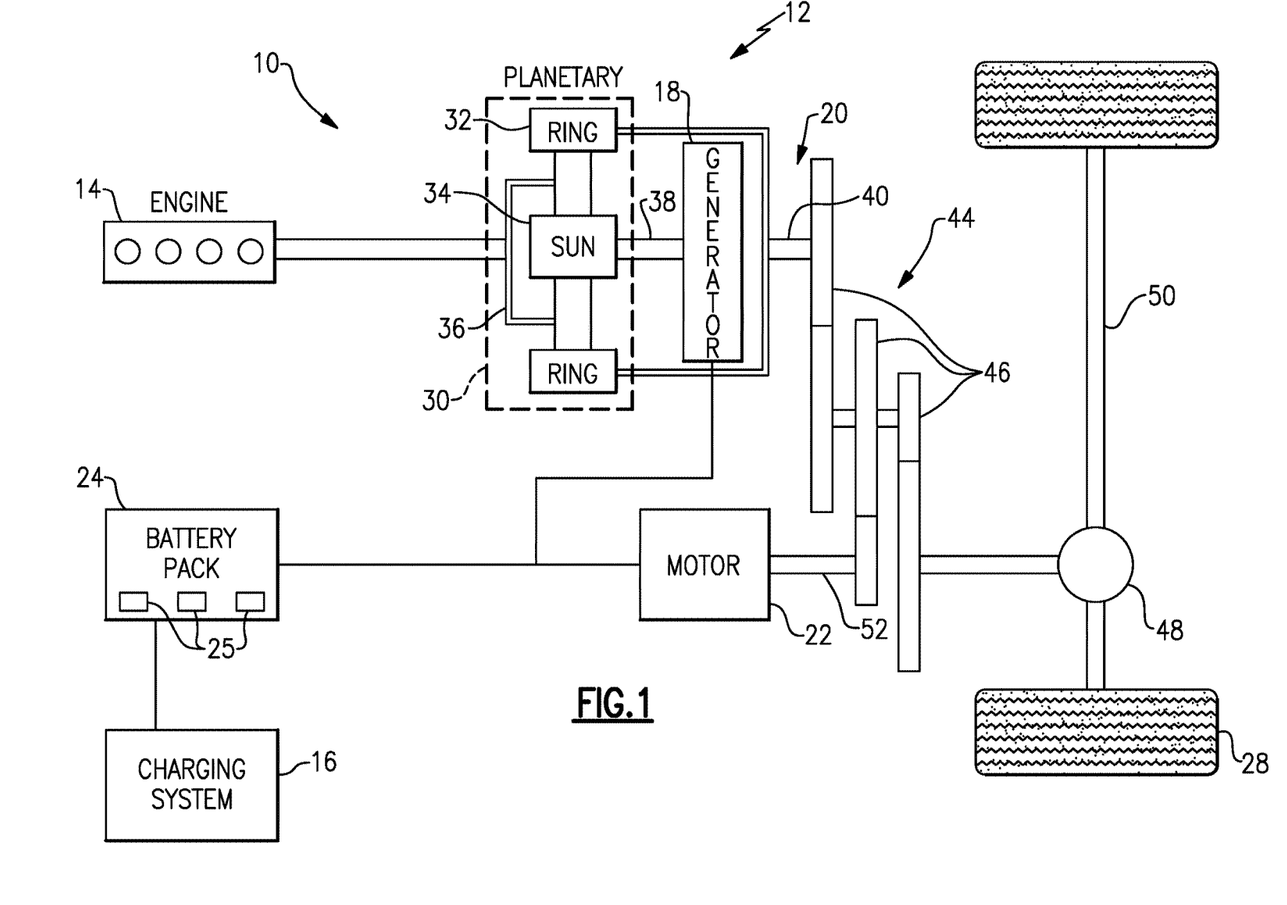
FIG. 1 schematically illustrates a powertrain of an electrified vehicle.

FIG. 1 schematically illustrates a powertrain 10 of an electrified vehicle 12. In one non-limiting embodiment, the electrified vehicle 12 is a hybrid electric vehicle (HEV). In another non-limiting embodiment, the electrified vehicle 12 is a fuel cell vehicle. In yet another non-limiting embodiment, the electrified vehicle 12 is an electric train. Other electrified vehicles, including any vehicle capable of generating electrical energy and sending it to the grid, could also benefit from the teachings of this disclosure.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 52 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has at least two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 may also include a charging system 16 for charging the energy storage devices (e.g., battery cells) of the battery pack 24. The charging system 16 may be connected to an external power source (not shown) for receiving and distributing power throughout the vehicle. The charging system 16 may also be equipped with power electronics used to convert AC power received from the external power supply to DC power for charging the energy storage devices of the battery pack 24. The charging system 16 may also accommodate one or more conventional voltage sources from the external power supply (e.g., 110 volt, 220 volt, etc.). In yet another non-limiting embodiment, the charging system 16 is an inductive charging system.

The powertrain 10 shown in FIG. 1 is highly schematic and is not intended to limit this disclosure. Various additional components could alternatively or additionally be employed by the powertrain 10 within the scope of this disclosure.

Figure 2:
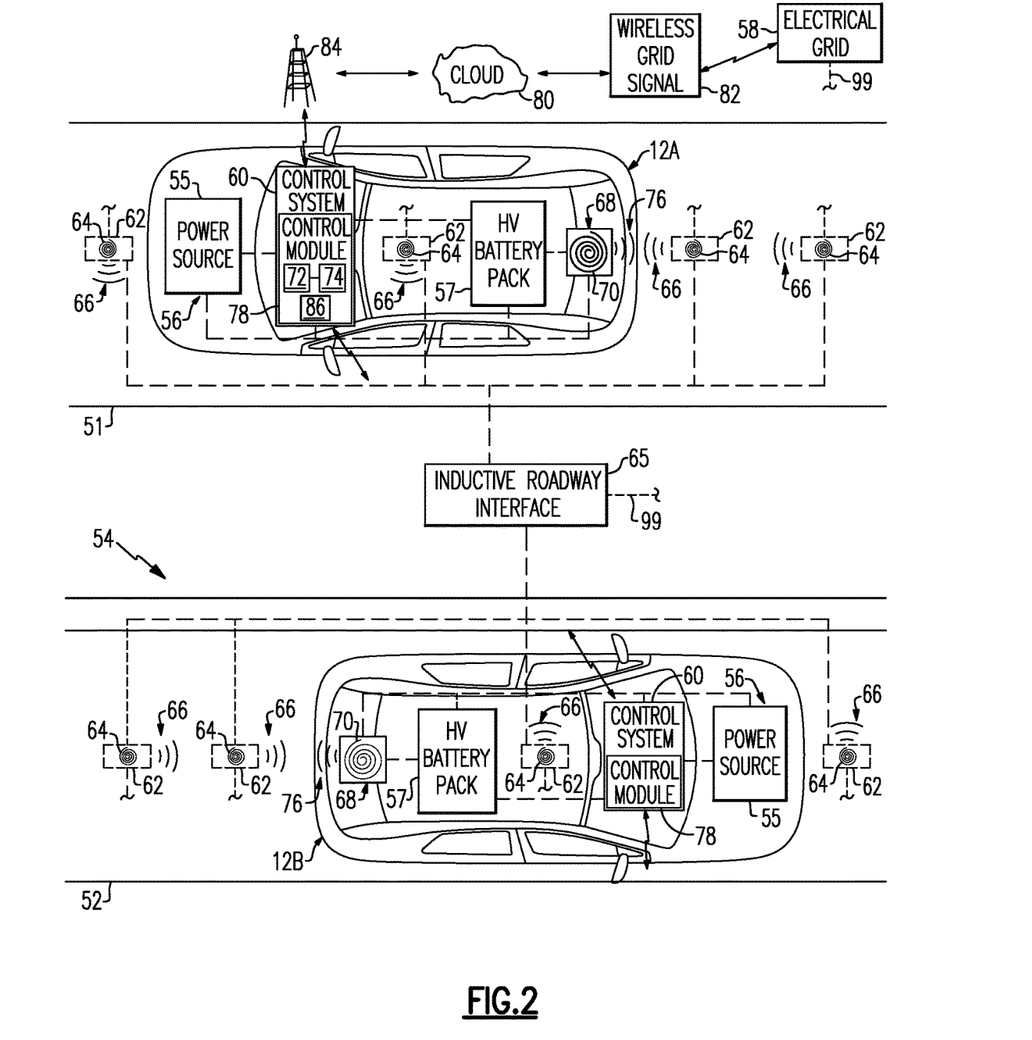
FIG. 2 illustrates electrified vehicles traveling along an inductive roadway.

FIG. 2 schematically depicts a first electrified vehicle 12A and a second electrified vehicle 12B traveling along an inductive roadway 54. The electrified vehicles 12A, 12B may be any distance from one another. The first electrified vehicle 12A is traveling along a first section S1 of the inductive roadway 54, and the second electrified vehicle 12B is traveling on a second section S2 of the inductive roadway 54. The first section S1 and the second section S2 are different sections of the inductive roadway 54, as is further discussed below. The first section S1 and the second section S2 are not necessarily directly adjacent to one another as depicted in the highly schematic rendering of FIG. 2. In addition, although two vehicles are depicted in this figure, any number of electrified vehicles could travel in the vicinity of one another along the inductive roadway 54.

The inductive roadway 54 includes a network of interconnected charging modules 62 that may be embedded inside the inductive roadway 54 or fixated overhead of the inductive roadway 54, for example. In a non-limiting embodiment, each of the first section S1 and the second section S2 of the inductive roadway 54 includes a plurality of charging modules 62. The charging modules 62 are connected to and thus powered by an electrical grid 58 (shown schematically at connection 99). Each charging module 62 includes a coil 64 capable of selectively emitting an electromagnetic field 66 for either transferring energy to the electrified vehicle 12 or receiving energy from the electrified vehicle 12. Thus, the charging modules 62 may act as either receiver or transmitter devices. An inductive roadway interface 65 of the inductive roadway 54 is configured to communicate with the electrified vehicles 12A, 12B for controlling operation of the charging modules 62 to either send electrical energy to the electrified vehicle 12 or receive electrical energy from the electrified vehicles 12A, 12B.

Each electrified vehicle 12A, 12B includes an inductive charging system 68 having a coil 70 adapted to communicate with the coils 64 of the charging modules 62 of the inductive roadway 54 via electromagnetic induction. The coils 70 of the inductive charging systems 68 are capable of emitting an electromagnetic field 76 for either receiving energy from the inductive roadway 54 or transferring energy to the inductive roadway 54. Thus, like the charging modules 62, the inductive charging systems 68 may act as either receivers or transmitters.

As the electrified vehicles 12A, 12B travel along the inductive roadway 54, the coils 70 of the inductive charging systems 68 may be maneuvered into relatively close proximity to the coil 64 of one or more of the charging modules 62 so that power can be transmitted between the electrified vehicles 12A, 12B and the inductive roadway 54. In this disclosure, the term "inductive roadway event" indicates an event in which an electrified vehicle is traveling along the inductive roadway 54 and is either accepting electrical energy from the inductive roadway 54 or sending electrical energy to the inductive roadway 54.

Each electrified vehicle 12A, 12B includes a vehicle system 56 configured to communicate with other electrified vehicles, the inductive roadway 54, and the electrical grid 58 in a manner that influences the electrical grid 58. For example, it may be desirable to improve the efficiencies of both the electrical grid 58 and the electrified vehicles 12A, 12B that are traveling along the inductive roadway 54. Thus, as further detailed below, operation of the electrified vehicles 12A, 12B may be coordinated and selectively controlled in a manner that influences the electrical grid 58 during an inductive roadway event.

The various components of each vehicle system 56 are shown schematically in FIG. 2 to better illustrate the features of this disclosure. These components, however, are not necessarily depicted in the exact locations where they would be found in an actual vehicle.

In a non-limiting embodiment, each exemplary vehicle system 56 includes a power source 55, a high voltage battery pack 57, the inductive charging system 68, and a control system 60. The power source 55 may be an engine, such as an internal combustion engine, a fuel cell, or any other device capable of generating electricity. The battery pack 57 may include one or more battery assemblies each having a plurality of battery cells, or any other type of energy storage device. The energy storage devices of the battery pack 57 store electrical energy that is selectively supplied to power various electrical loads residing onboard the electrified vehicle 12. These electrical loads may include various high voltage loads (e.g., electric machines, etc.) or various low voltage loads (e.g., lighting systems, low voltage batteries, logic circuitry, etc.). The energy storage devices of the battery pack 57 are configured to either accept energy received at the inductive charging system 68 from the inductive roadway 54 or add energy to the inductive roadway 54.

Each inductive charging system 68 may be equipped with power electronics configured to convert AC power received from the inductive roadway 54, and thus from the electrical grid 58, to DC power for charging the energy storage devices of the battery pack 57, or for converting the DC power received from the battery pack 57 to AC power for adding energy to the electrical grid 58. The inductive charging system 68 may also be configured to accommodate one or more conventional voltage sources.

One exemplary function of the control system 60 of each vehicle system 56 is to control operation of the power source 55 during certain conditions to help balance the electrical grid 58. For example, the control system 60 may adjust operation of the power source 55 to either conserve a state of charge (SOC) of the battery pack 57 or deplete the SOC of the battery pack 57 during an inductive roadway event depending on the state of the electrical grid 58. The power source 55 of each electrified vehicle 12A, 12B may be commanded ON (e.g., the power output may be increased or the run time may be increased) and its associated actuators adjusted during the inductive roadway event if the electrical grid 58 has an energy shortage. The battery pack 57 SOC is therefore conserved during the drive event for adding energy to the electrical grid during the subsequent inductive roadway event. The operation of each power source 55 may alternatively be restricted (e.g., the power output is decreased or the run time is decreased) and its associated actuators adjusted during the inductive roadway event if the electrical grid 58 has an energy surplus. The battery pack 57 SOC is therefore depleted during the inductive roadway event and can be replenished by accepting energy from the electrical grid 58 during a subsequent portion of the inductive roadway event. Each control system 60 may additionally control various other operational aspects of the electrified vehicle 12.

Each control system 60 may be part of an overall vehicle control system or could be a separate control system that communicates with the vehicle control system. The control systems 60 include one or more control modules 78 equipped with executable instructions for interfacing with and commanding operation of various components of the vehicle system 56. For example, in one non-limiting embodiment, each of the power source 55, the battery pack 57, and the inductive charging system 68 include a control module, and these control modules communicate with one another over a controller area network (CAN) to control the electrified vehicles 12A, 12B. In another non-limiting embodiment, each control module 78 of the control system 60 includes a processing unit 72 and non-transitory memory 74 for executing the various control strategies and modes of the vehicle system 56. Exemplary control strategies are further discussed below with reference to FIG. 3 and FIG. 6.

Another exemplary function of each control system 60 is to communicate with the electrical grid 58 over a cloud 80 (i.e., the internet). Upon an authorized request, a wireless grid signal 82 may be transmitted to the control systems 60.

Each wireless grid signal 82 includes instructions for controlling the electrified vehicles 12A, 12B in order to balance the electrical grid 58 during an inductive roadway event. These instructions may be based, at least in part, on whether the electrical grid 58 is likely to experience an energy shortage or an energy surplus during the inductive roadway event. In a non-limiting embodiment, the wireless grid signals 82 instruct the control systems 60 to adjust the operation of the power sources 55 during the inductive roadway event to either conserve/increase the SOC of the battery packs 57 (e.g., to anticipate SOC depletion if energy shortage conditions are expected) or deplete the SOC of the battery packs 57 (e.g., to anticipate SOC increase if energy surplus conditions are expected).

The wireless grid signals 82 may be communicated via a cellular tower 84 or some other known communication technique. The control systems 60 may include a transceiver 86 for bidirectional communication with the cellular tower 84. For example, each transceiver 86 can receive the wireless grid signal 82 from the electrical grid 58 or can communicate data back to the electrical grid 58 via the cellular tower 84. Although not necessarily shown or described in this highly schematic embodiment, numerous other components may enable bidirectional communication between the electrified vehicles 12A, 12B and the electrical grid 58.

Yet another exemplary function of the control systems 60 is to communicate with the inductive roadway interface 65 of the inductive roadway 54. In a non-limiting embodiment, each control system 60 communicates information to the inductive roadway interface 65 for coordinating the exchange of energy between the charging modules 62 and the inductive charging system 68. This information includes, but is not limited to, vehicle identification data, vehicle location data, vehicle direction and velocity data, and charging data. The charging data may include requested power, maximum charging power, maximum discharge power, priority of charge or discharge, etc. The control systems 60 are equipped with all necessary hardware and software for achieving secure, bidirectional communication with both the electrical grid 58 and the inductive roadway 54.

In yet another non-limiting embodiment, the first section S1 of the inductive roadway 54 is an area of expected power absorption, and the second section S2 of the inductive roadway 54 is an area of expected power usage. Non-limiting examples of areas of expected power absorption include downhill sections or exit ramps of the inductive roadway 54, and non-limiting examples of areas of expected power usage include uphill sections and on-ramps of the inductive roadway 54. In such a situation, operation of the electrified vehicles 12A, 12B (and any other electrified vehicles in near proximity) may be coordinated and controlled in a manner that influences the efficiency of both the electrical grid 58 and each electrified vehicle 12A, 12B.

For example, rather than supplying the second electrified vehicle 12B with energy from the electrical grid 58 as it travels along the second section S2, energy (e.g., excess regeneration energy harvested during travel along the section S1 of the inductive roadway 54) may instead be transferred from the first electrified vehicle 12A to the inductive roadway interface 65 and then from the inductive roadway interface 65 to the second electrified vehicle 12B for powering that vehicle along the second section S2. The control systems 60, the inductive roadway interface 65, and the electrical grid 58 are adapted to communicate with one another for coordinating such an energy transfer between the first and second electrified vehicles 12A, 12B during an inductive roadway event.

Figure 3:
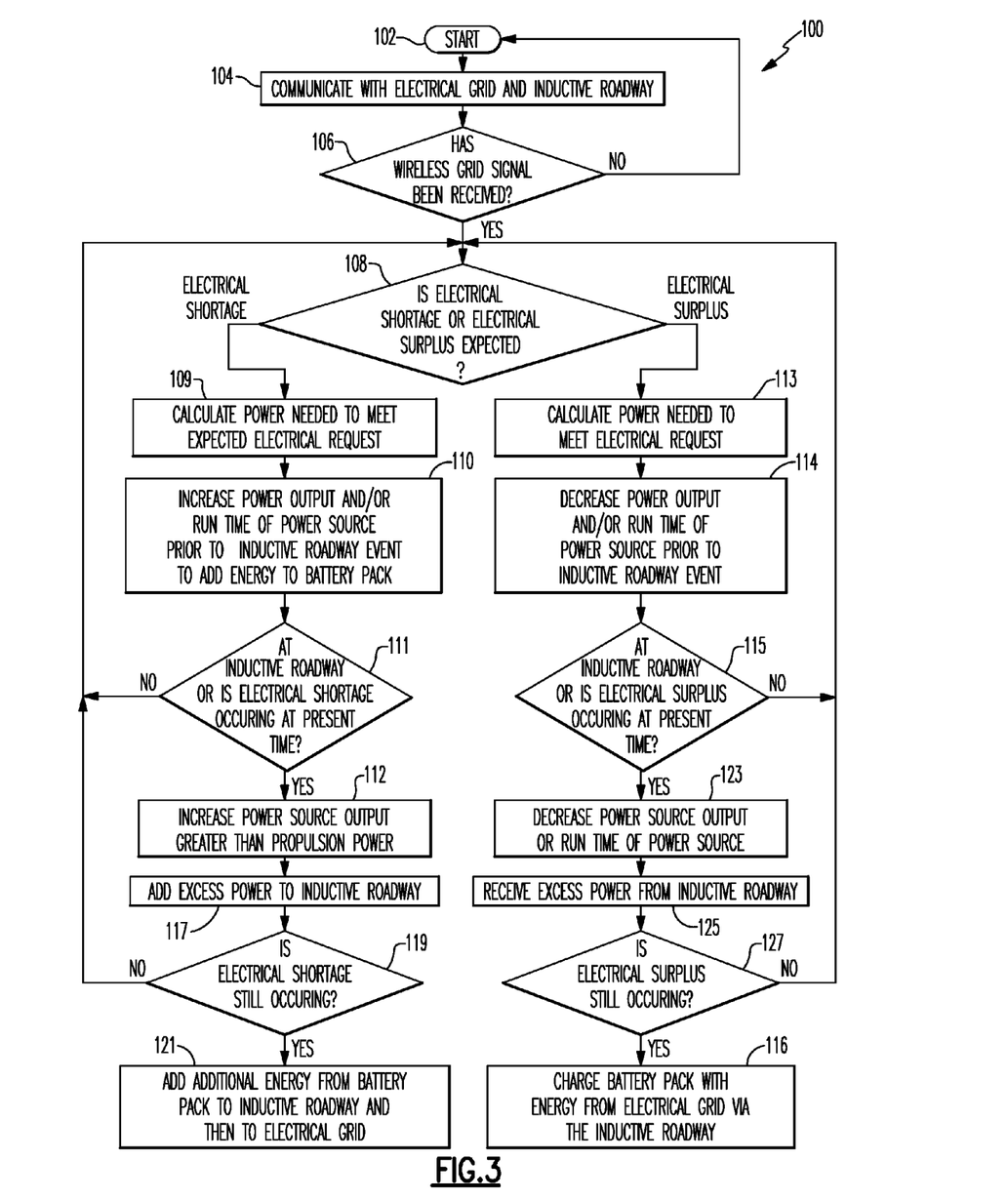
FIG. 3 schematically illustrates a control strategy for controlling an electrified vehicle in a manner that aids in balancing an electrical grid while traveling along an inductive roadway.

FIG. 3, with continued reference to FIGS. 1 and 2, schematically illustrates a control strategy 100 for controlling the vehicle system 56 of an electrified vehicle 12 (e.g., either the vehicle 12A, the vehicle 12B, or both). For example, the control strategy 100 can be performed to control operation of the electrified vehicle 12 in a manner that balances the electrical grid 58 during an inductive roadway event. In one non-limiting embodiment, the control system 60 of the vehicle system 56 is programmed with one or more algorithms adapted to execute the exemplary control strategy 100, or any other control strategy. In another non-limiting embodiment, the control strategy 100 is stored as executable instructions in the non-transitory memory 74 of the control module 78 of the control system 60.

The control strategy 100 begins at block 102. At block 104, the electrified vehicle 12 communicates with the electrical grid 58 and the inductive roadway 54. Vehicle data associated with the electrified vehicle 12 is collected by the control system 60 and may be communicated to both the electrical grid 58 and the inductive roadway interface 65. The vehicle data may include expected drive routes of the electrified vehicle 12, current and expected SOC's of the battery pack 57, charging information, and any other relevant vehicle information. The vehicle data can optionally be used by the electrical grid 58 and/or the inductive roadway interface 65 to schedule inductive charging events during the inductive roadway event in a manner that influences the electrical grid 58.

The control system 60 of the electrified vehicle 12 determines whether a wireless grid signal 82 has been received from the electrical grid 58 at block 106. The electrical grid 58 may predict whether it is likely to have an energy shortage or an energy surplus at any given date, day and time. These predictions may be based on expected energy demand that may fluctuate based on conditions such as weather affecting the demand for household A/C usage; and compared to, expected energy production from renewable sources, to determine opportunities to optimize the usage and storage of renewable energy in connection with a vehicle battery. The renewable production sources may vary based on sun and wind forecasts. Furthermore, the total energy production of renewable and fossil fuel is compared to the demand to determine if storing or using more vehicle battery can be used to balance transient grid imbalances rather than employing additional low-efficiency gas generators. The wireless grid signal 82 is based on these predictions and includes instructions for controlling the electrified vehicle 12 to balance the electrical grid 58.

Next, at block 108, the wireless grid signal 82 is analyzed by the control system 60 to determine whether the electrical grid 58 anticipates an energy shortage or an energy surplus during the next expected inductive roadway event of the electrified vehicle 12. If an energy shortage is expected, the control strategy 100 proceeds to block 109 by calculating the power needed to meet the electrical request of the electrical grid 58 (e.g., power needed=electrical power requested+ immediate vehicle propulsion power). Next, at block 110, the control system 60 actuates the power source 55 ON so that the power source 55 powers the electrified vehicle 12 instead of the battery pack 57. This may include increasing the power output and/or increasing the run time of the power source 55 if the power source 55 is already running. In this way, the SOC of the battery pack 57 is conserved during the inductive roadway event. In another non-limiting embodiment, the power output of the power source 55 can be controlled during block 110 to generate a greater amount of power than is necessary to propel the electrified vehicle 12 to charge the battery pack 57 to a greater SOC during certain grid conditions, such as extreme grid shortages. After confirming whether the electrified vehicle 12 is still traveling on an inductive roadway or confirming that the electrical shortage is still occurring at block 111, the power output of the power source 55 is increased to greater than the propulsion power required to propel the electrified vehicle 12 at block 112. Excess power can be added to the inductive roadway at block 117. The control strategy 100 can then yet again confirm that an electrical shortage is occurring at block 119.

The conserved energy of the battery pack 57 may then be added to the electrical grid 58 to address the energy shortage at block 121 during the inductive roadway event. This may occur by first transferring the electrical energy from the battery pack 57 to the inductive charging system 68, which sends the energy to one or more of the charging modules 62 of the inductive roadway 54. Once received by the inductive roadway 54, the energy can be added to the electrical grid 58.

Alternatively, if an energy surplus is expected at block 108, the power needed to meet the electrical request of the electrical grid is determined at block 113. The control strategy 100 then proceeds to block 114 and minimizes operation of the power source 55 prior to the inductive roadway event so that the battery pack 57 primarily powers the electrified vehicle 12. In this way, the SOC of the battery pack 57 is depleted during the inductive roadway event. After confirming whether the electrified vehicle 12 is still traveling on an inductive roadway or confirming the electrical surplus again at block 115, the power output or the run time of the power source 55 is decreased at block 123. Excess power can then be received from the inductive roadway at block 125. The control strategy 100 can then yet again confirm that an electrical surplus is occurring at block 127. Finally, the battery pack 57 can be charged with power received by the inductive charging system 68 from the charging modules 62 of the inductive roadway 54, which is first communicated from the electrical grid 58 to the inductive roadway 54, to address the energy surplus at block 116.

Figure 4:
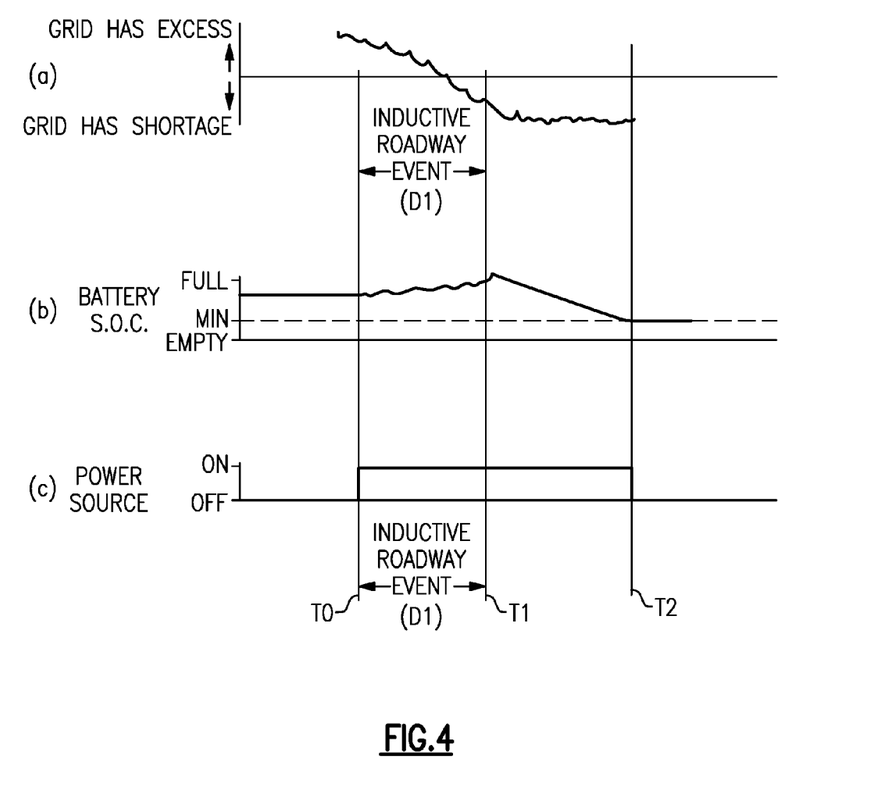
FIGS. 4 and 5 schematically illustrate exemplary implementations of the control strategy of FIG. 3.
Figure 5:
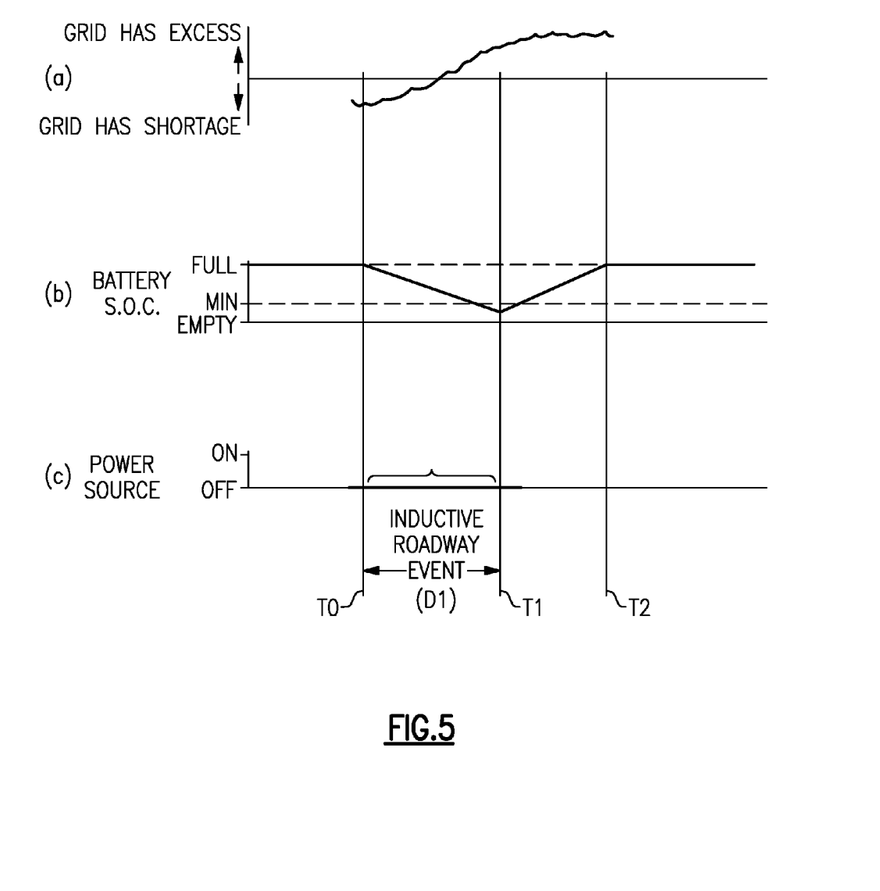

FIGS. 4 and 5 graphically illustrate exemplary implementations of the control strategy 100 described by FIG. 3. These examples are provided for illustrative purposes only, and therefore, the specific values and parameters indicated in these figures are not intended to limit this disclosure in any way.

FIG. 4 illustrates a first grid condition in which an electrical grid shortage is expected at a time T1 of the next expected inductive roadway event of the electrified vehicle 12 (see graph (a)). To address such a shortage, the power source 55 of the electrified vehicle 12 is commanded ON (see graph (c)) at time T0, which marks the beginning of an inductive roadway event D1, to conserve the SOC of the battery pack 57 during the inductive roadway event D1. The battery pack 57 SOC stays relatively consistent during the inductive roadway event D1 (see graph (b)). Therefore, during a time period between the time T1 and a time T2, the electrical grid 58 is able to draw power from the battery pack 57, through the interface with the inductive roadway 54, to help balance the electrical grid 58 (see graph (b)).

FIG. 5 illustrates a second grid condition in which an electrical grid surplus is expected at the time T1 of the next expected inductive roadway event D1 of the electrified vehicle 12 (see graph (a)). To address such a surplus, operation of the power source 55 of the electrified vehicle 12 is restricted during the inductive roadway event D1 and power source 55 start commands are inhibited (see graph (c)) to maximize battery pack 57 usage during the inductive roadway event D1. The battery pack 57 SOC is depleted during the inductive roadway event D1 (see graph (b)). Therefore, during a time period between the times T1 and T2, the electrical grid 58 is able to send needed power to the inductive roadway 54 which then sends the power to the electrified vehicle 12 for replenishing the SOC of the battery pack 57 to help balance the electrical grid 58 (see graph (b)).

Figure 6:
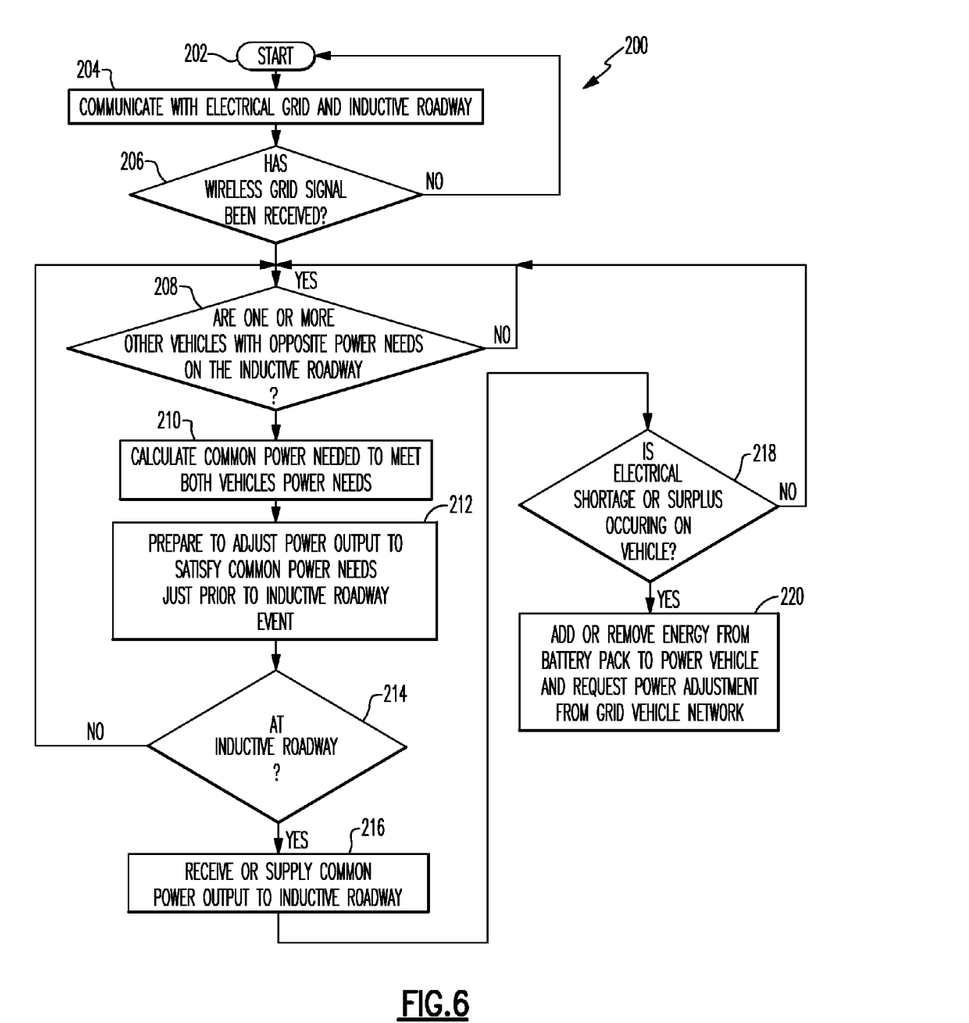
FIG. 6 schematically illustrates another control strategy for coordinating operation of electrified vehicles traveling along an inductive roadway in a manner that influences the efficiency of the inductive roadway.

FIG. 6, with continued reference to FIGS. 1 and 2, schematically illustrates a control strategy 200 for coordinating operation of two or more electrified vehicles 12A, 12B traveling along an inductive roadway 54. The control strategy 200 begins at block 202. At block 204, the electrified vehicles 12A, 12B both communicate with the electrical grid 58 and the inductive roadway 54. Vehicle data associated with the electrified vehicles 12A, 12B is collected by the control systems 60 and may be communicated to both the electrical grid 58 and the inductive roadway interface 65. The vehicle data may be transmitted by Wi-Fi or cell phone using a secure protocol. The vehicle data may include expected drive routes of the electrified vehicles 12A, 12B, current and expected SOC's of the battery packs 57, charging information, and any other relevant vehicle information. The vehicle data can optionally be used by the electrical grid 58 and/or the inductive roadway interface 65 to schedule inductive charging events during the inductive roadway event in a manner that influences the electrical grid 58.

The control system 60 of each electrified vehicle 12A, 12B determines whether a wireless grid signal 82 has been received from the electrical grid 58 at block 206. The electrical grid 58 may predict whether it is likely to have an energy shortage or an energy surplus at any given date, day and time. These predictions may be based on expected energy demand that fluctuates based on conditions such as weather affecting the demand for household A/C usage; and compared to, expected energy production from renewable sources, to determine opportunities to optimize the usage and storage of renewable energy in connection with a vehicle battery. The renewable production sources may vary based on sun and wind forecasts. Furthermore, the total energy production of renewable and fossil fuel is compared to the demand to determine if storing or using more vehicle battery can be used to balance transient grid imbalances rather than employing additional low-efficiency gas generators. The wireless grid signal 82 is based on these predictions and includes instructions for controlling each electrified vehicle 12A, 12B to influence the electrical grid 58.

Next, at block 208, the control strategy 200 determines whether one or more other electrified vehicles with opposite power needs are traveling along the inductive roadway 54. For example, in a non-limiting embodiment, the control systems 60 of the first electrified vehicle 12A communicates with the control system 60 of the second electrified vehicle 12B to determine if the second electrified vehicle 12B has power needs which are the opposite of the needs of the first electrified vehicle 12A. As used herein, "opposite power needs" refers to the situation where one vehicle has a need to discharge energy and a nearby vehicle has a need to receive energy. In another non-limiting embodiment, the inductive roadway interface 65 coordinates communication between the controls systems 60 of the electrified vehicles 12A, 12B. Although two vehicles are described in this example, there could be multiple other electrified vehicles traveling along the inductive roadway 54 which have opposite power needs from the first electrified vehicle 12A. For example, if only partial opposite power is available from the second electrified vehicle 12B, the first electrified vehicle 12A proceeds with the reduced power until another vehicle (e.g., a third electrified vehicle) can complete the required power sum in combination with the second electrified vehicle 12B or a forth electrified vehicle is available that can fully match the needs of the first electrified vehicle 12A.

If it is confirmed at block 208 that there are two or more electrified vehicles on the inductive roadway 54 that have opposite power needs, the control strategy proceeds to block 210. At this step, the common power needed to meet the power needs of both the first and second electrified vehicles 12A, 12B is calculated. In a non-limiting embodiment, for example, the control system 60 of the second electrified vehicle 12B may determine that it will need additional power for traveling along the second section S2 of the inductive roadway 54, and the control system 60 of the first electrified vehicle 12A may determine that it will have excess power it needs to discharge while traveling on the first section S1 of the inductive roadway 54. The control systems 60 thus coordinate with one another to calculate the common power needs of both the first electrified vehicle 12A and the second electrified vehicle 12B. The control systems 60 may then prepare to adjust the power output of the electrified vehicles 12A, 12B to satisfy the common power needs at block 212. Power output of the electrified vehicles 12A, 12B may be adjusted by supplying more or less battery power, engine power, or wheel torque just prior to the inductive roadway event.

After confirming an inductive roadway event at block 214, the control strategy 200 proceeds to block 216 and the inductive roadway 54 either supplies energy to the electrified vehicles 12A, 12B or receives energy from the electrified vehicles 12A, 12B. Continuing with the example of the first electrified vehicle 12A traveling on the first section S1 and the second first electrified vehicle 12B traveling on the second section S2 of the inductive roadway 54, the first electrified vehicle 12A discharges its excess regeneration energy to the inductive roadway interface 65 while traveling along the first section S1, and this energy is then supplied to the second electrified vehicle 12B, such as to charge the cells of the battery pack 57 or some other energy storage device. In this way, the excess regeneration energy of the first electrified vehicle 12A that is harvested by traveling along the first section S1 of the inductive roadway 54 is used to power the second electrified vehicle 12B as it travels along an area of high power usage (i.e., the second section S2), thus decreasing the amount of energy that must be supplied by the electrical grid 58 during the inductive roadway event.

The control strategy 200 may next proceed to block 218 where a determination is made whether the energy storage devices of the electrified vehicles 12A, 12B are still exhibiting an electrical shortage or an electrical surplus after the power transfer that occurs at block 216. If YES, additional energy is either added or removed from the energy storage devices at block 220 by supplying energy from the electrical grid 58 or supplying energy to the electrical grid 58 through the inductive roadway interface 65. This step may be performed, for example, if the energy transfer occurring at block 216 in insufficient to meet the common power demands of the electrified vehicles 12A, 12B.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for influencing the efficiency of an electrical grid, comprising:
    coordinating operation of a first electrified vehicle and a second electrified vehicle traveling along an inductive roadway and having opposite power needs in a manner that influences an amount of energy supplied by the electrical grid during an inductive roadway event; and
    adding energy from the first electrified vehicle to the inductive roadway and then from the inductive roadway to the second electrified vehicle when the first electrified vehicle is traveling along an area of expected power absorption of the inductive roadway and the second electrified vehicle is traveling along an area of expected power usage of the inductive roadway.

2. A method for influencing the efficiency of an electrical grid, comprising:
    coordinating operation of a first electrified vehicle and a second electrified vehicle traveling along an inductive roadway and having opposite power needs in a manner that influences an amount of energy supplied by the electrical grid during an inductive roadway event; and
    prior to coordinating operation, determining whether the first electrified vehicle and the second electrified vehicle are traveling along the inductive roadway and are exhibiting the opposite power needs.

3. A method for influencing the efficiency of an electrical grid, comprising:
    coordinating operation of a first electrified vehicle and a second electrified vehicle traveling along an inductive roadway and having opposite power needs in a manner that influences an amount of energy supplied by the electrical grid during an inductive roadway event,
    wherein coordinating operation of the first electrified vehicle and the second electrified vehicle includes:
    controlling an inductive charging system of the first electrified vehicle and the second electrified vehicle to either send electrical energy to the inductive roadway or accept electrical energy from the inductive roadway.

4. A method for influencing the efficiency of an electrical grid, comprising:
    coordinating operation of a first electrified vehicle and a second electrified vehicle traveling along an inductive roadway and having opposite power needs in a manner that influences an amount of energy supplied by the electrical grid during an inductive roadway event,
    wherein coordinating operation of the first electrified vehicle and the second electrified vehicle includes:
    discharging energy from the first electrified vehicle traveling on a first section of the inductive roadway to an inductive roadway interface; and
    powering a second electrified vehicle traveling on a second section of the inductive roadway using the energy discharged from the first electrified vehicle.

5. The method as recited in claim 4, comprising:
    adding additional energy to the second electrified vehicle from the electrical grid when an electrical shortage is still occurring on the second electrified vehicle after powering the second electrified vehicle using the energy discharged from the first electrified vehicle.

6. The method as recited in claim 4, comprising:
    discharging additional energy from the first electrified vehicle to the inductive roadway when an electrical surplus is still occurring on the first electrified vehicle after powering the second electrified vehicle using the energy discharged from the first electrified vehicle.

* * * * *